April 19, 1927.
C. O. SCHOOLEY
1,625,503
CABLE REEL
Filed Oct. 8, 1925
FIG. I.
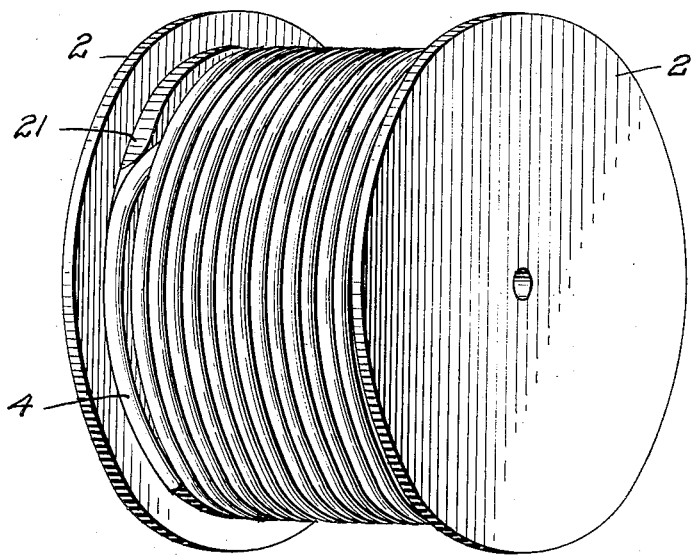
FIG. II.
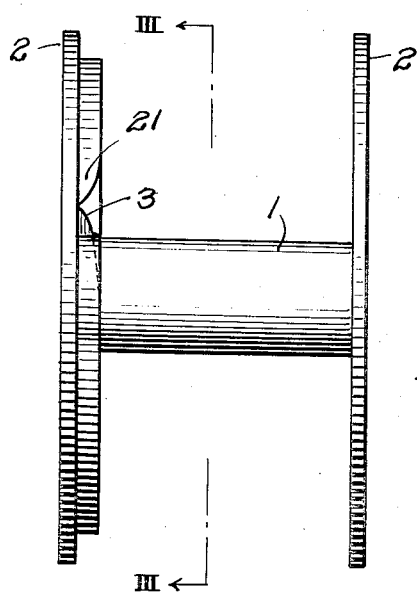
FIG. III.
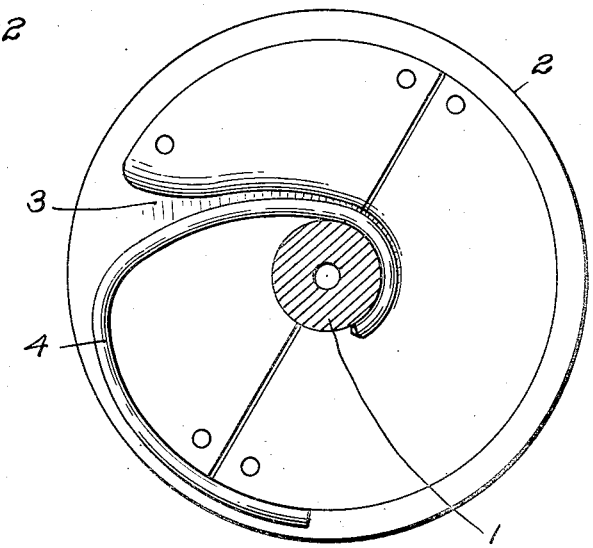
WITNESSES
J. Herbert Bradley
Percy A. English
INVENTOR
Claude O. Schooley
by Christy and Christy
his attorneys Patented Apr. 19, 1927.

1,625,503

UNITED STATES PATENT OFFICE.

CLAUDE O. SCHOOLEY, OF PERTH AMBOY, NEW JERSEY, ASSIGNOR TO STANDARD UNDERGROUND CABLE COMPANY, OF PITTSBURGH, PENNSYLVANIA, A CORPORATION OF PENNSYLVANIA.

CABLE REEL.

Application filed October 8, 1925. Serial No. 61,195.

My invention relates to improvements in reels for cables, and consists in a reel adapted to carry a cable in such position as to be accessible for purposes of testing and yet protected against accidental injury.

In the accompanying drawings, Fig. I is a view in perspective of the reel of my invention, carrying a cable in place upon it; Fig. II is a view in side elevation, and Fig. III a view in transverse section, of an empty reel. The plane of section of Fig. III is in Fig. II indicated by the line III—III.

Such an electric cable as the familiar lead-sheathed underground cable is ordinarily prepared for transportation by being wound on a reel, and it is convenient, and indeed a practical necessity, to wind the cable upon the reel progressively, as it is completed in the factory. Ordinarily the coiled body of the cable upon the reel is necessarily several layers deep. The finished cable, coiled upon a reel, must be subjected to test, whether in the hands of the manufacturer or of the purchaser and user, and for purposes of test the inner end of the cable, as well as the outer end, must be accessible. The reel is ordinarily made of wood, and is spool shaped, consisting of a relatively slender drum or body and of opposite widely-extending ends or flanges. It has hitherto been the practice, in order to make the inner end of a length of cable wound upon a reel accessible for testing, to resort to one or the other of two expedients. One of these expedients is to lay the first-applied end of the cable against the inner surface of one of the flanges, so that it extends from the periphery of the flange, and then continues in a coil upon the drum; the other expedient is to form in the flange an opening through which the first applied and inner end of the cable protrudes. Both expedients are unsatisfactory. If the inner end of the cable extends over the inner surface of the flange the remainder of the length of cable is necessarily coiled against a reel flange whose otherwise plane surface is interrupted by the outstanding body of cable. In consequence, the coiled-on body of cable is subjected to localized strain which in particular cases proves injurious. If according to the other expedient mentioned, the cable-end be carried through the end flange of the reel, it must be bent abruptly and secured, and furthermore it must there be shielded from accidental injury. The thrusting of the cable end through a hole in the flange and the abrupt bending are undesirable. The shield structure, whatever it be, may be injured, and the shielded cable-end as well. Furthermore, an excrescence upon the outer face of the reel flange is an annoyance and an inconvenience in the handling of the loaded reel.

The reel of my invention includes the usual drum 1 and opposite flanges 2. The body 1 is ordinarily perforate axially, as shown, to the end that the reel may be mounted for turning upon an axle.

Upon the inner face of one of the flanges 2 of the reel I form a groove 3, extending from the periphery of the flange to the circular line in which the flange meets the drum, preferably tangent to that circular line, and preferably spiral, or approximately so, to the axis of turning. This groove in width will be sufficient and, at its outer end at least, in depth also will be sufficient to receive the cable. In depth it may taper, from a maximum at its outer end to zero at its inner end.

Comparison of Fig. I with the remaining figures will reveal fully the invention and the practical condition of its employment. The first-applied end of a length of cable is in Fig. I indicated at 4. It is laid in groove 3 and extends from the outer end of the groove inward to the drum, upon which the coiling of the cable proceeds otherwise in usual manner. The accumulating coil holds the inner end secure from displacement, and when the coil is completed, not the outer end only, but the inner end of the cable as well, is accessible for testing purposes. Furthermore, the cable is protected against accidental bending on too short a radius, and the inner end is exposed at a point between the end flanges of the reel, where it is protected from injury, and where its protrusion is no annoyance nor limitation upon the free normal handling of the loaded reel.

I preferably form the reel flange 2 with the more minute refinements shown in the drawings. The reel flange is stepped, or provided with an inwardly arranged cylindrical extension 21 of reduced diameter. This stepped portion is less in radius than the maximum radius of the flange, by as much as the diameter of the largest cable contemplated, and the stepped portion extends from the inner face of the flange in direction of the length of the reel to a depth as great as the diameter of the largest cable contemplated. The groove 3, whose width and depth (at its outer end, at least) are determined by the same unit of measure, is formed wholly within this stepped extension, and the curvature of the groove is made continuous at the outer end with the curvature of the outer face of the stepped extension, and at the inner end with the curvature of the face of the drum 1. This clearly appears in Fig. III.

Fig. III shows also diagrammatically the end of a cable laid in the groove. The specially shaped flange affords all the advantage of bringing the inner end of the coil out upon the inner face of one of the reel flanges, and yet overcomes the difficulty due to unequal strains, mentioned above; it avoids those objectionable conditions, incident to bringing the inner end out through the reel flange. The coil is secure, protected against injury in shipment; and a very much greater extent of cable-end may be laid against the face of the stepped extension 21 and, ultimately, may be accessible for testing purposes.

The extension 21 may be made as a separable and removable part, to be applied as desired. This also is indicated in Fig. III.

I claim as my invention:

1. A reel for an electric cable including a cylindrical drum and a circular end flange, said end flange being provided on its inner face with a groove extending spirally from and in a curvature continuous with the curvature of the drum, such groove extending to the periphery of the flange.

2. A reel for an electric cable including a cylindrical drum and a circular end flange, said end flange being provided with an inner cylindrical extension of reduced diameter, such inner extension being grooved on its inner face, the groove extending from the periphery of the drum to the periphery of the extension and being disposed at its inner end in a curve continuous with the curve of the drum and at its outer end in a curve continuous with the curve of the periphery of the extension.

3. A reel bearing a wound-on coil of electric cable, said reel being formed as defined in claim 2, and said cable being coiled thereon with its inner end resting in the groove in the extension and extending thence upon the outer cylindrical face of the extension.

In testimony whereof I have hereunto set my hand.

CLAUDE O. SCHOOLEY